United States Patent
Starosta et al.

(10) Patent No.: US 11,625,640 B2
(45) Date of Patent: Apr. 11, 2023

(54) DISTRIBUTED RANDOM FOREST TRAINING WITH A PREDICTOR TRAINED TO BALANCE TASKS

(71) Applicant: Cisco Technology, Inc., San Jose, CA (US)

(72) Inventors: Radek Starosta, Prague (CZ); Jan Brabec, Rakovnik (CZ); Lukas Machlica, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 1003 days.

(21) Appl. No.: 16/152,578

(22) Filed: Oct. 5, 2018

(65) Prior Publication Data

US 2020/0111030 A1 Apr. 9, 2020

(51) Int. Cl.
*G06N 20/00* (2019.01)
*G06N 7/00* (2023.01)
*G06N 5/00* (2023.01)

(52) U.S. Cl.
CPC ............. *G06N 20/00* (2019.01); *G06N 5/003* (2013.01); *G06N 7/00* (2013.01)

(58) Field of Classification Search
CPC .......... G06N 20/00; G06N 20/20; G06N 7/00; G06N 7/005; G06N 99/005; G06N 3/08;
(Continued)

(56) References Cited

U.S. PATENT DOCUMENTS 9,928,443 B2 * 3/2018 Cootes ................. G06K 9/6282
10,127,497 B2 * 11/2018 Eslami .................... G06N 7/005
(Continued)

FOREIGN PATENT DOCUMENTS

CN 105550374 A * 5/2016
WO WO-2020043267 A1 * 3/2020 ........... G06K 9/6263

OTHER PUBLICATIONS

Anghel et al., "Benchmarking and Optimization of Gradient Boosted Decision Tree Algorithms" Sep. 12, 2018, pp. 1-8. (Year: 2018).*
(Continued)

*Primary Examiner* — Ying Yu Chen
*Assistant Examiner* — Chase P. Hinckley
(74) *Attorney, Agent, or Firm* — Behmke Innovation Group LLC; Kenneth J. Heywood; Jonathon P. Western

(57) ABSTRACT

In one embodiment, a device distributes sets of training records from a training dataset for a random forest-based classifier among a plurality of workers of a computing cluster. Each worker determines whether it can perform a node split operation locally on the random forest by comparing a number of training records at the worker to a predefined threshold. The device determines, for each of the split operations, a data size and entropy measure of the training records to be used for the split operation. The device applies a machine learning-based predictor to the determined data size and entropy measure of the training records to be used for the split operation, to predict its completion time. The device coordinates the workers of the computing cluster to perform the node split operations in parallel such that the node split operations in a given batch are grouped based on their predicted completion times.

20 Claims, 10 Drawing Sheets

(58) Field of Classification Search
CPC ...... G06N 3/0445; G06N 3/049; G06N 5/003; G06N 5/043; G06F 9/5038
See application file for complete search history.

(56) References Cited

U.S. PATENT DOCUMENTS

| | | | |
|---|---|---|---|
| 10,339,465 B2* | 7/2019 | Steele | G06N 20/00 |
| 11,169,288 B1* | 11/2021 | Johnson | G01V 1/306 |
| 11,315,045 B2* | 4/2022 | Tsou | G06N 5/003 |
| 2014/0172753 A1 | 6/2014 | Nowozin et al. | |
| 2015/0379426 A1* | 12/2015 | Steele | G06N 20/00 706/12 |
| 2016/0078361 A1 | 3/2016 | Brueckner et al. | |
| 2017/0213280 A1* | 7/2017 | Kaznady | G06N 20/20 |
| 2017/0293859 A1* | 10/2017 | Gusev | G06F 16/24578 |
| 2018/0189667 A1* | 7/2018 | Tsou | G06N 20/20 |
| 2018/0260531 A1* | 9/2018 | Nori | G06N 7/005 |
| 2019/0026663 A1* | 1/2019 | Homeyer | G06Q 10/06316 |
| 2019/0034834 A1* | 1/2019 | Jiang | G06F 9/4881 |
| 2019/0171952 A1* | 6/2019 | Jiang | G06F 9/52 |
| 2019/0236273 A1* | 8/2019 | Saxe | G06N 3/0454 |
| 2019/0251468 A1* | 8/2019 | Guillame-bert | G06N 20/00 |
| 2019/0286486 A1* | 9/2019 | Ma | G06N 20/00 |
| 2020/0160225 A1* | 5/2020 | Sun | G06Q 10/06 |
| 2020/0219016 A1* | 7/2020 | Zeng | G06F 9/44594 |
| 2020/0311559 A1* | 10/2020 | Chattopadhyay | G06N 5/04 |
| 2021/0081847 A1* | 3/2021 | Jin | G06Q 30/0269 |
| 2021/0124983 A1* | 4/2021 | Axenie | G06K 9/6263 |

OTHER PUBLICATIONS

Kozik et Choras, "Pattern Extraction Algorithm for NetFlow-Based Botnet Activities Detection" Oct. 17, 2017, pp. 1-10. (Year: 2017).*
Jiang et al., "DimBoost: Boosting Gradient Boosting Decision Trees to Higher Dimensions" Jun. 2018, pp. 1363-1376. (Year: 2018).*
Sharchilev et al., "Finding Influential Training Samples for Gradient Boosted Decision Trees" Mar. 12, 2018, pp. 1-10. (Year: 2018).*
Meng et al., "A Communication-Efficient Parallel Algorithm for Decision Tree" Nov. 4, 2016, pp. 1-14. (Year: 2016).*
Kozik, Rafal, "Distributed System for Botnet Traffic Analysis and Anomaly Detection" 2017, pp. 330-335. (Year: 2017).*
Xie et al., "Quantum-Inspired Ensemble Method and Quantum-Inspired Forest Regressors" Nov. 22, 2017, pp. 1-17. (Year: 2017).*
Takhirov et al., "Field of Groves: An Energy-Efficient Random Forest" Apr. 10, 2017. (Year: 2017).*
Hibino et al., "Denoising random forests" Oct. 30, 2017, pp. 1-15. (Year: 2017).*
Kaur, Gagandeep, "A Novel Distributed Machine Learning Framework for Semi-Supervised Detection of Botnet Attacks" Aug. 2018. (Year: 2018).*
Campos et al., "Stacking Bagged and Boosted Forests for Effective Automated Classification" Aug. 2017, pp. 105-114. (Year: 2017).*
Choromanska et al., "On the boosting ability of top-down decision tree learning algorithm for multiclass classification" May 17, 2016, pp. 1-17. (Year: 2016).*
Ke et al., "LightGBM: A Highly Efficient Gradient Boosting Decision Tree" 2017, pp. 1-9. (Year: 2017).*
Chen et al., "XGBoost: A Scalable Tree Boosting System" Jun. 10, 2016. (Year: 2016).*
Mitchell et al., "XGBoost: Scalable GPU Accelerated Learning" Jun. 29, 2018, pp. 1-5. (Year: 2018).*
Shi et al., "Gradient Boosting with Piece-Wise Linear Regression Trees" Apr. 4, 2018, pp. 1-21. (Year: 2018).*
Ghosal et Hooker, "Boosting Random Forests to Reduce Bias: One-Step Boosted Forest and its Variance Estimate" Mar. 21, 2018, pp. 1-29. (Year: 2018).*
Afrin et al., "Balanced Random Survival Forests for Extremely Unbalanced, Right Censored Data" Apr. 12, 2018, pp. 1-27. (Year: 2018).*
Ponomareva et al., "TF Boosted Trees: A scalable TensorFlow based framework for Gradient Boosting" Oct. 31, 2017. (Year: 2017).*
Ren et al., "A Dynamic Boosted Ensemble Learning Method Based on Random Forest" Apr. 24, 2018, pp. 1-13. (Year: 2018).*
Probst et al., "Hyperparameters and Tuning Strategies for Random Forest" Apr. 10, 2018, pp. 1-18. (Year: 2018).*
Guillame-bert et al., "Systems and Methods for Distributed Generation of Decision Tree-Based Models" Feb. 9, 2018, U.S. Appl. No. 62/628,608. (Year: 2018).*
Guillame-bert et Teytaud, "Exact Distributed Training: Random Forest with Billions of Examples" Apr. 18, 2018, arXiv:1804.06755v1. (Year: 2018).*
Chen et al., "A Parallel Random Forest Algorithm for Big Data in a Spark Cloud Computing Environment" Aug. 31, 2016, pp. 1-14. (Year: 2016).*
Chen et al., "Parallel Data Mining and Applications in Hospital Big Data Processing" May 19, 2017, pp. 403-425. (Year: 2017).*
Wang et al., "DistForest: A Parallel Random Forest Training Framework based on Supercomputer" Jun. 28, 2018, pp. 196-214. (Year: 2018).*
Lulli et al., "ReForeSt: Random Forests in Apache Spark" Sep. 2017, pp. 331-339. (Year: 2017).*
Abuzaid et al., "Yggdrasil: An Optimized System for Training Deep Decision Trees at Scale" 2016, pp. 1-9. (Year: 2016).*
Shen et al., "Deep Regression Forests for Age Estimation" Dec. 19, 2017, arXiv: 1712.07195v1. (Year: 2017).*
Chao et al., "A gray-box performance model for Apache Spark" Jun. 21, 2018, pp. 58-67. (Year: 2018).*
Xu et al., "Research and Implementation of Improved Random Forest Algorithm Based on Spark" 2017, pp. 499-503. (Year: 2015).*
Pospisil et Lee, "RFCDE: Random Forests for Conditional Density Estimation" May 2, 2018, arXiv: 1804.05753v2, pp. 1-6. (Year: 2018).*
Biau et al., "Neural Random Forests" Apr. 3, 2018, arXiv: 1604.07143v2, pp. 1-42. (Year: 2018).*
Wang et al., "Using a Random Forest to Inspire a Neural Network and Improving on It" Jun. 30, 2017, pp. 1-9. (Year: 2017).*
Wakayana et al., "Distributed forests for MapReduce-based machine learning" 2015. (Year: 2015).*
Wang et al., "A Novel Consistent Random Forest Framework: Bernoulli Random Forests" Jul. 18, 2018, pp. 3510-3523. (Year: 2018).*
Owen, Sean "A Taste of Random Decision Forests on Apache Spark" 2015, pp. 1-36. (Year: 2015).*
Zhang et al., "Cascaded Random Forest for Hyperspectral Image Classification" Apr. 11, 2018, pp. 1082-1094. (Year: 2018).*
Singhal et al., "Performance Assurance Model for Applications on SPARK Platform" Aug. 2017, pp. 1-17. (Year: 2017).*
Zhang et al., "Intelligent RDD Management for High Performance In-Memory Computing in Spark" Apr. 2017, pp. 873-874. (Year: 2017).*
Abuzaid, et al., "Yggdrasil: An Optimized System for Training Deep Decision Trees at Scale", 29th Conference on Neural Information Processing Systems (NIPS 2016), Barcelona, Spain., pp. 1-12, 2016, nips.cc.
Chung, Sung Hwan., "Sequoia Forest: A Scalable Random Forest Implementation on Spark", https://pdfs.semanticscholar.org/presentation/a1c1/0b3767d73105aa1184985e38c3ea9b4a54a2.pdf, 32 pages, 2016, Alpine Data Labs.
Gieseke, et al., "Training Big Random Forests with Little Resources", arXiv:1802.06394v1, Feb. 18, 2018, 9 pages, arXiv.org.
Panda, et al., "PLANET: Massively Parallel Learning of Tree Ensembles with MapReduce", VLDB '09, Aug. 24-28, 2009, Lyon, France., 12 pages, 2009, VLDB Endowment, ACM.
Tulloch, Andrew., "Speeding up Decision Tree Training", http://tullo.ch/articles/speeding-up-decision-tree-training, Nov. 3, 2013, 7 pages, tullo.ch.
"Apache Mahout", https://mahout.apache.org/, 2 pages, Accessed on Aug. 15, 2018, The Apache Software Foundation.
Hastie, T.; Tibshirani, R.; et al. The Elements of Statistical Learning: Data Mining, Inference, and Prediction. Springer series in statis-tics, Springer, 2009, ISBN 9780387848846, 305-317 pp.

(56) References Cited

OTHER PUBLICATIONS

Breiman, L. Random Forests. Machine Learning, vol. 45, No. 1, Oct. 2001: pp. 5-32, ISSN 1573-0565, doi:10.1023/A:1010933404324.
Meng, X.; Bradley, J. K.; et al. MLlib: Machine Learning in Apache Spark. CoRR, vol. abs/1505.06807, 2015, 1505.06807.
Zaharia, M.; Xin, R. S.; et al. Apache Spark: A Unified Engine for Big Data Processing. Commun. ACM, vol. 59, No. 11, Oct. 2016: pp. 56â¢65, ISSN 0001-0782, doi:10.1145/2934664.
Hyafil, L.; Rivest, R. L. Constructing optimal binary decision trees is NP-complete. Information Processing Letters, vol. 5, No. 1, 1976: pp. 15.
Pedregosa, F.; Varoquaux, G.; et al. Scikit-learn: Machine Learning in Python. Journal of Machine Learning Research, vol. 12, 2011: pp. 2825-2830.
H2O. https://www.h2o.ai/h2o.
Alsabti, K.; Ranka, S.; et al. CLOUDS: A Decision Tree Classifier for Large Datasets. In KDD, AAAI Press, 1998, pp. 2-8.
Jansson, K.; Sundell, H.; et al. gpuRF and gpuERT: Efficient and Scalable GPU Algorithms for Decision Tree Ensembles. In IPDPS Workshops, IEEE Computer Society, 2014, pp. 1612-1621.
Dean, J.; Ghemawat, S. MapReduce: Simplified Data Processing on Large Clusters. Commun. ACM, vol. 51, No. 1, Jan. 2008: pp. 107-113, ISSN 0001-0782, doi:10.1145/1327452.1327492.
Chen, T.; Guestrin, C. XGBoost: A Scalable Tree Boosting System. CoRR, vol. abs/1603.02754, 2016, 1603.02754.
Hadoop MapReduce. https://hadoop.apache.org/docs/stable/hadoop-mapreduce-client/hadoop-mapreduce-client-core/MapReduceTutorial.html.
Google App Engine: MapReduce Overview. https://web.archive.org/web/20130120053524/https://developers.google.com/appengine/docs/python/dataprocessing/overview.
Yildiz, B.; Buyuktanir, T.; et al. Equi-depth Histogram Construction for Big Data with Quality Guarantees. CoRR, vol. abs/1606.05633, 2016, 1606.05633.
Abuzaid, F.; Bradley, J. K.; et al. Yggdrasil: An Opti-mized System for Training Deep Decision Trees at Scale. In Advances in Neural Information Processing Systems 29: An-nual Conference on Neural Information Processing Systems 2016, Dec. 5-10, 2016, Barcelona, Spain, 2016, pp. 3810-3818.
Apache Parquet, https://parquet.apache.org.
Yggdrasil implementation; https://github.com/fabuzaid21/yggdrasil.
[SPARK-3162]: Train Decision Trees Locally When Possible. https://docs.google.com/document/d/1baU5KeorrmLpC4EZoqLuG-E8sUJqmdELLbr8o6wdbVM.
Apache Mahout. https://mahout.apache.org.
[MAHOUT-1510]: Goodbye MapReduce. https://issues.apache.org/jira/browse/MAHOUT-1510.
H2O: Building Random Forest At Scale. https://www.slideshare.net/ 0xdata/rf-brighttalk.
Random Forest Benchmark, https://github.com/szilard/benchm-ml.
Chung, S. H. Sequoia Forest: A Scalable Random Forest Implementation on Spark. https://pdfs.semanticscholar.org/presentation/a1c1/0b3767d73105aa1184985e38c3ea9b4a54a2.pdf, 2016.
Spark wins Daytona Gray Sort 100TB Benchmark, https://spark.apache.org/news/spark-wins-daytona-gray-sort-100tb-benchmark.html.
Apache Spark: Cluster Overview. https://spark.apache.org/docs/2.3.0/cluster-overview.html.
Apache Hadoop YARN, https://hadoop.apache.org/docs/current/hadoop-yarn/hadoop-yarn-site/YARN.html.
Zaharia, M.; Chowdhury, M.; et al. Resilient Distributed Datasets: A Fault-tolerant Abstraction for In-memory Cluster Computing. In Pro-ceedings of the 9th USENIX Conference on Networked Systems Design and Implementation, NSDIâ€™ 12, Berkeley, CA, USA: USENIX Association, 2012, pp. 2-2.
Apache Spark MLlib:Random Forest Classifier, https://spark.apache.org/docs/latest/ml-classification-regression.html#random-forest-classifier.
[SPARK-3162] [MLlib] Add local tree training for decision tree regressors. https://github.com/apache/spark/pull/19433.
Bin-Packing. Berlin, Heidelberg: Springer Berlin Heidelberg, 2006, ISBN 978-3-540-29297-5, pp. 426-441, doi:10.1007/3-540-29297-7_18.
Schreiber, E. L.; Korf, R. E. Improved Bin Completion for Optimal Bin Packing and Number Partitioning. In Proceedings of the Twenty-Third International Joint Conference on Artificial Intelligence, IJCAI '13, AAAI Press, 2013, ISBN 978-1-57735-633-2, pp. 651-658.
Yue, M. A simple proof of the inequality FFD (L) ï¿¿11/9 OPT (L) + 1, ï¿¿L for the FFD bin-packing algorithm. Acta Mathematicae Applicatae Sinica, vol. 7, No. 4, Oct. 1991: pp. 321-331, ISSN 1618-3932, doi:10.1007/BF02009683.
Kutner, M. Applied Linear Statistical Models. McGrwa-Hill international edition, McGraw-Hill Irwin, 2005, ISBN 9780071122214, 214-255 pp.
Bartos, K.; Sofka, M. Robust Representation for Domain Adaptation in Network Security. In Proceedings, Part III, of the European Conference on Machine Learning and Knowledge Discovery in Databases—vol. 9286, ECML PKDD 2015, Berlin, Heidelberg: Springer-Verlag, 2015, ISBN 978-3-319-23460-1, pp. 116-132, doi:10.1007/978-3-319-23461-8_8.
Amazon EMR. https://aws.amazon.com/emr/.

* cited by examiner

DISTRIBUTED RANDOM FOREST TRAINING WITH A PREDICTOR TRAINED TO BALANCE TASKS

TECHNICAL FIELD

The present disclosure relates generally to computer networks, and, more particularly, to distributed random forest training with a predictor trained to balance tasks.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. In many cases, such traffic is benign. However, some traffic may also be malicious in nature, such as downloading malware to a client, exfiltrating sensitive data from the local client, or conveying command and control (C&C) commands to a client already infected with malware.

With the ever-increasing volume and variety of traffic flows in a network, the task of determining whether any given flow is malicious in nature is becoming increasingly complex. In many cases, this means that training a flow classifier is no longer possible on a single device. This is both true from a device resource perspective, as well as from a timing perspective, as the amount of time to train the classifier grows with the training dataset. Moreover, classifier retraining is also required on a periodic basis, to account for new forms of traffic flows, destination URLs, and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
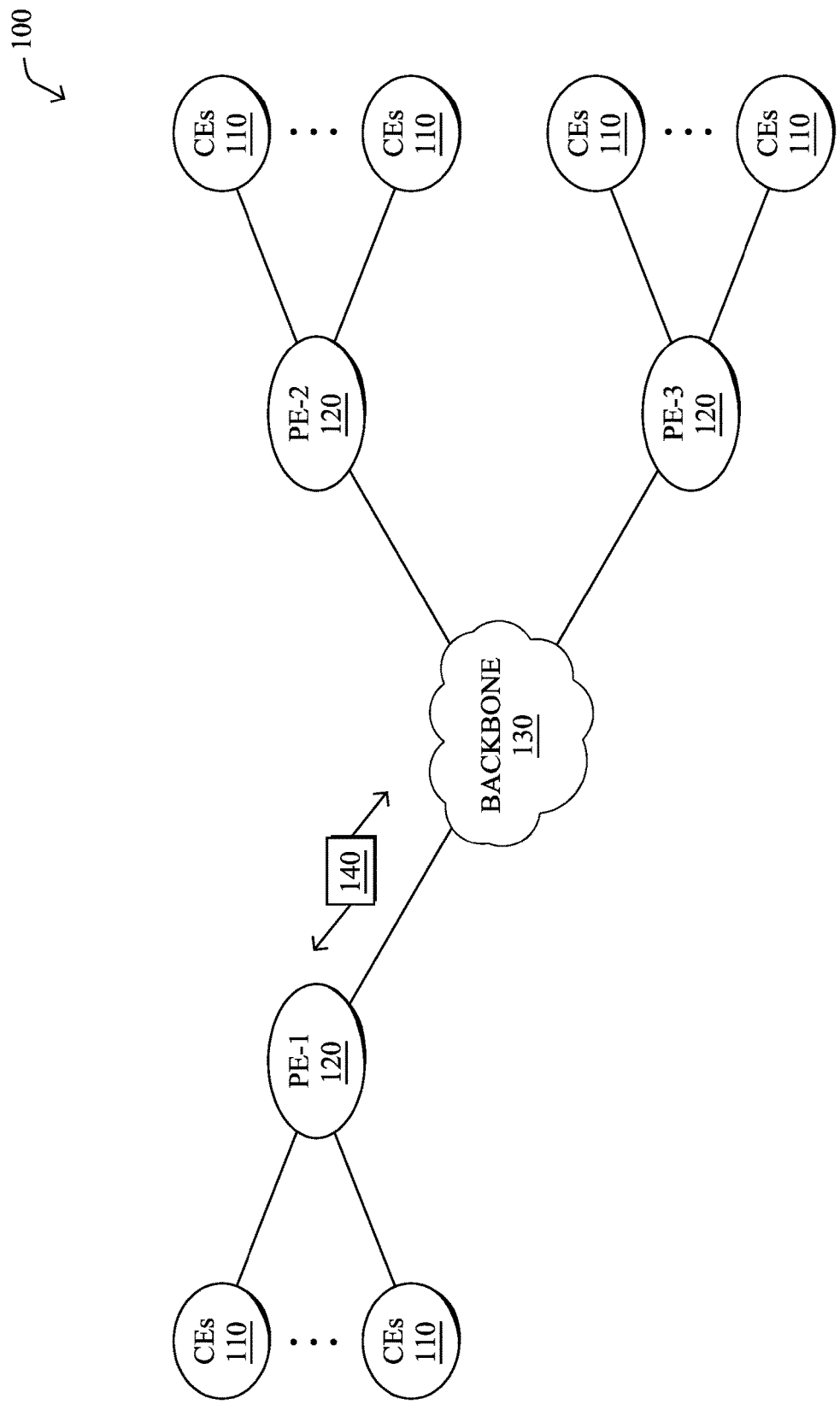
FIGS. 1A-1B illustrate an example communication network.

According to one or more embodiments of the disclosure, a device distributes sets of training records from a training dataset for a random forest-based classifier among a plurality of workers of a computing cluster. Each worker determines whether it can perform a node split operation locally on the random forest by comparing a number of training records at the worker to a predefined threshold. The device determines, for each of the split operations to be performed locally by the workers, a data size and entropy measure of the training records to be used for the split operation. The device applies, for each of the split operations to be performed locally by the workers, a machine learning-based predictor to the determined data size and entropy measure of the training records to be used for the split operation, to predict a completion time for the split operation. The device coordinates the workers of the computing cluster to perform the node split operations in parallel such that the node split operations in a given batch are grouped based on their predicted completion times.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate net81work node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, to size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
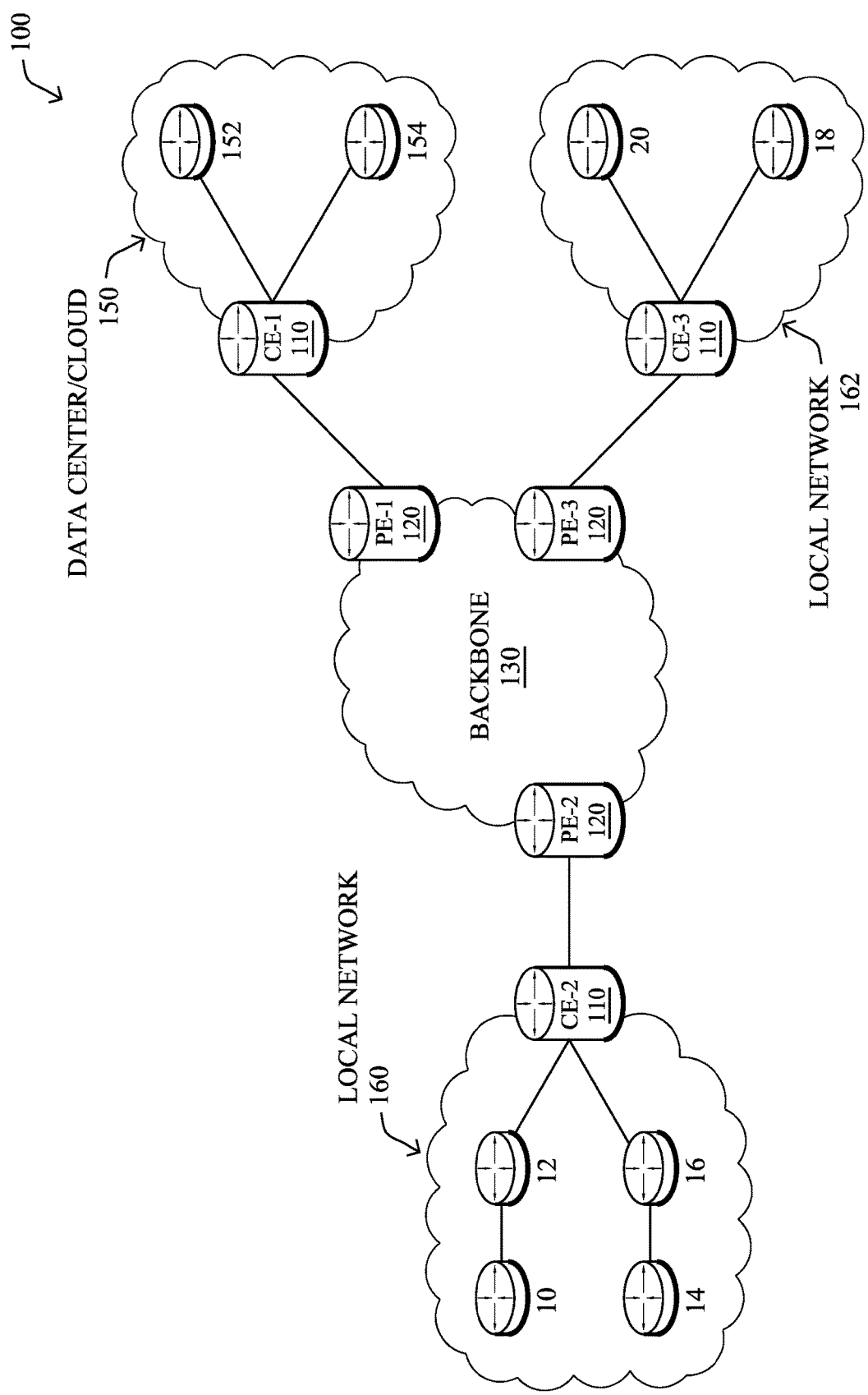

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, is cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
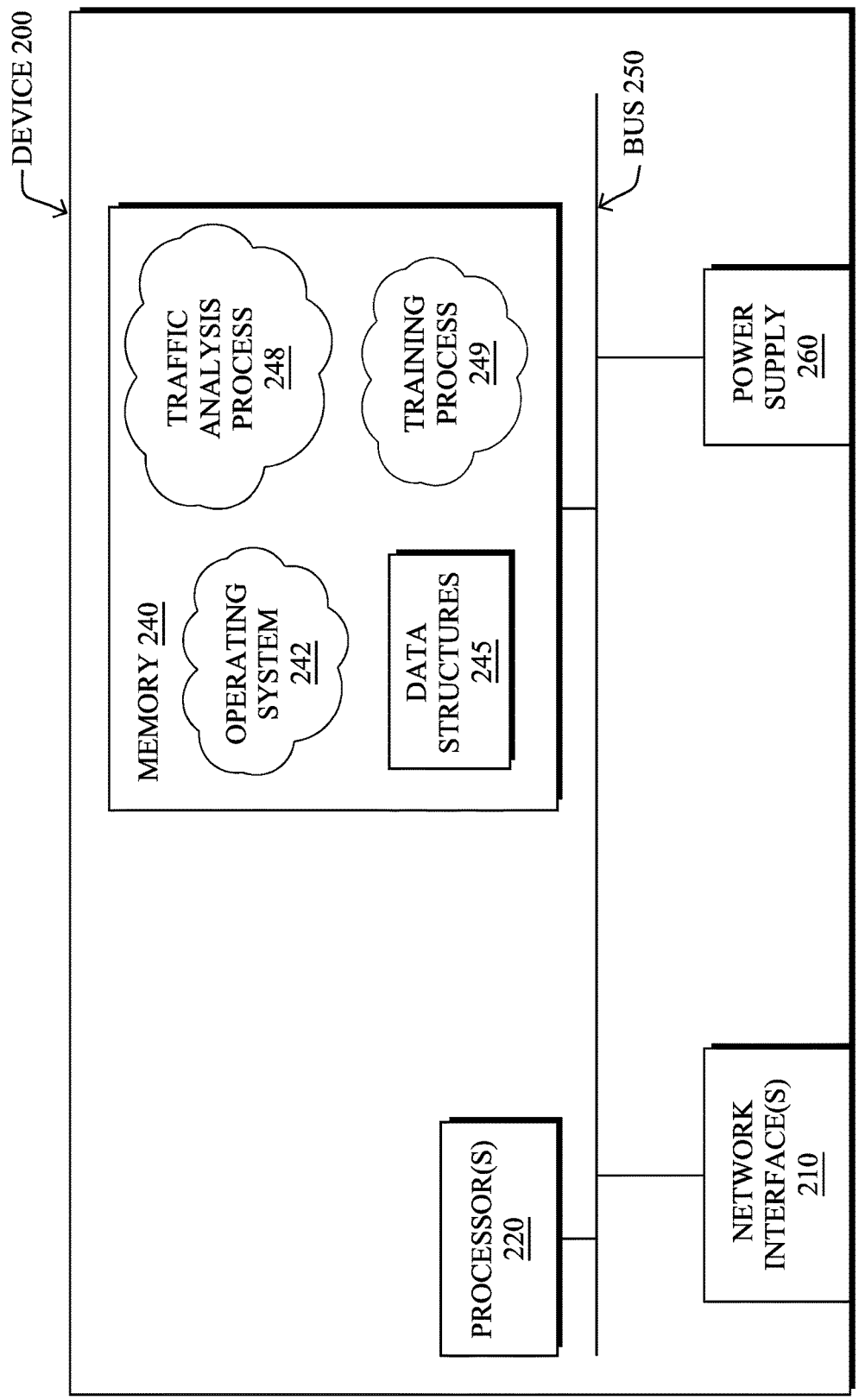
FIG. 2 illustrates an example network device/node.

FIG. 2 is a schematic block diagram of an example node/device 200 that may be is used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors to and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify traffic in the network (and its originating application) for any number of purposes. In one embodiment, traffic analysis process 248 may assess captured telemetry data regarding one or more traffic flows, to determine whether a given traffic flow or set of flows are malicious in nature. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, is supervised learning entails the use of a training set of data, as noted above, that is used to train the model to apply labels to the input data. For example, the training data may include sample telemetry data that is "normal," or "malicious." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malicious, anomalous, etc. Conversely, the false negatives of the model may refer to the number of traffic flows that the model incorrectly classifies as normal, when actually malicious, anomalous, etc. True to negatives and positives may refer to the number of traffic flows that the model correctly classifies as normal or malicious, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
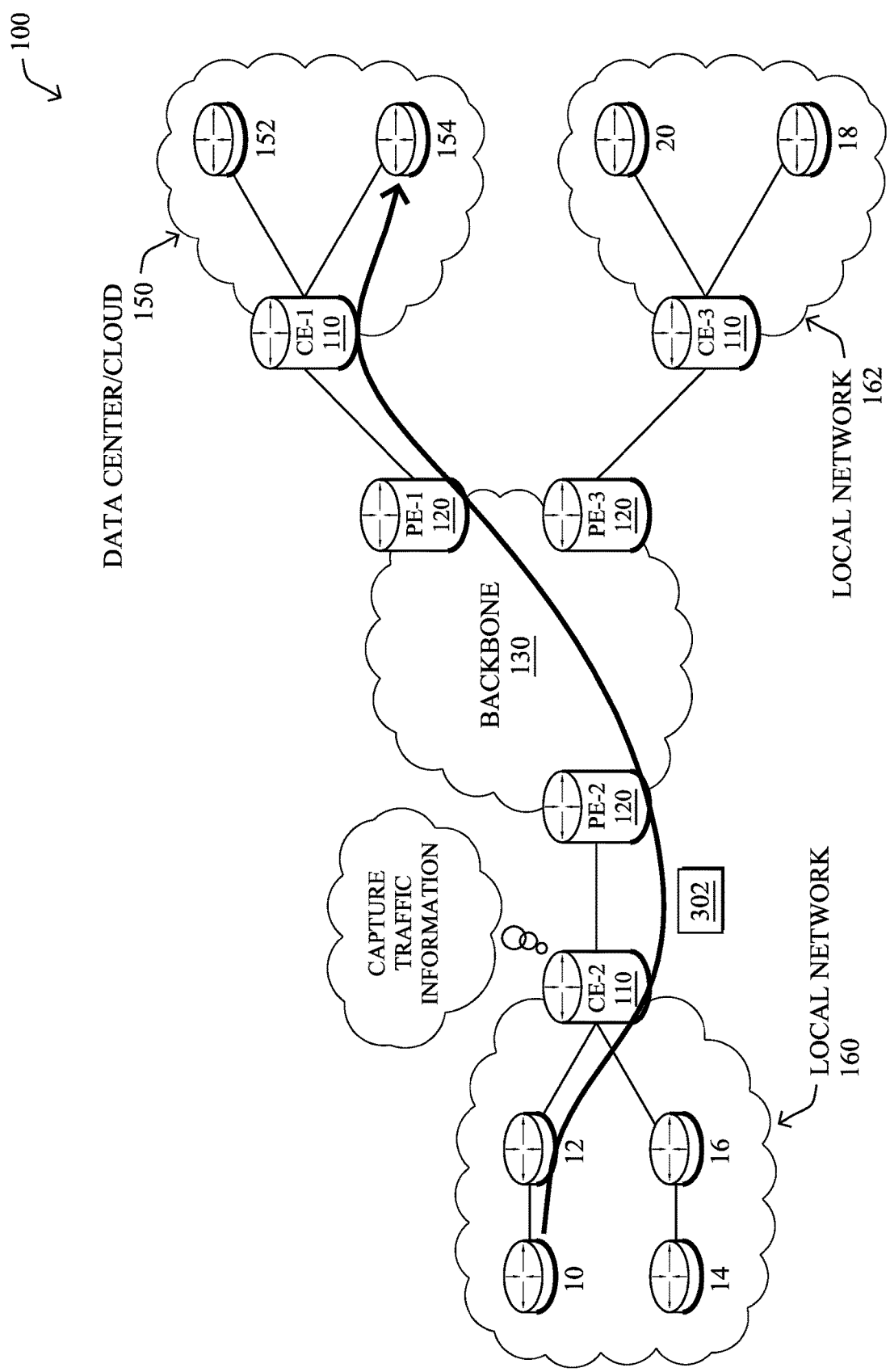
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, the captured telemetry data may take the form of proxy logs that contain HTTP flows, which represent a single communication between a user and a server. In particular, flows include both directions of the communication and store interesting data about the communication, such as URLs, source and destination IP addresses, number of transferred bytes, etc. The number of features extracted from each flow can number in the hundreds, in some cases, many of which are based on the URL.

The traffic analysis service can use the captured telemetry data/proxy logs to determine whether a given flow in the monitored network includes benign network traffic or malicious traffic. For example, the traffic analysis service may apply a machine learning-based classifier to the extracted features, to make the maliciousness determination. In many cases, such a classifier may leverage a decision tree-based method, as their results are easily interpretable, handle structured data well, are robust to outliers, and naturally allow for multiclass classification. Random forests are a commonly used tree ensemble method, which handles big data well and often achieves great prediction performance and generalization.

However, training a random forest classifier to detect malicious network traffic is not a trivial task. Notably, the numerous features available from the traffic flows, combined with the vast number of URLs in use today, result in a training dataset that is too large to perform training or re-training on a single device. Accordingly, the random forest classifier may be trained in a distributed manner using a computer cluster. Still, this is not a trivial undertaking and can consume a great deal of resources and time, with each retraining of the model.

Dynamic Random Forest Training with a Predictor Trained to Balance Tasks

The techniques herein introduce a mechanism that significantly speeds up the distributed training of random forests. In some aspects, this is achieved by training a machine learning-based predictor that predicts the duration of a training task, based on the data size and label entropy of a node. This makes the scheduling of the local training tasks on the workers of a computing cluster much more efficient, which can be quite useful in common scenarios where multiple models need to be trained on data with similar structure such as: periodic retraining or rapid experimentation.

Specifically, according to one or more embodiments of the disclosure as described in detail below, a device distributes sets of training records from a training dataset for a random forest-based classifier among a plurality of workers of a computing cluster. Each worker determines whether it can perform a node split operation locally on the random forest by comparing a number of training records at the worker to a predefined threshold. The device determines, for each of the split operations to be performed locally by the workers, a data size and entropy measure of the training records to be used for the split operation. The device applies, for each of the split operations to be performed locally by the workers, a machine learning-based predictor to the determined data size and entropy measure of the training records to be used for the split operation, to predict a completion time for the split operation. The device coordinates the workers of the computing cluster to perform the node split operations in parallel such that the node split operations in a is given batch are grouped based on their predicted completion times.

Illustratively, the techniques described herein may be performed by hardware, software, and/or firmware, such as in accordance with the training process 249, which may include computer executable instructions executed by the processor 220 (or independent processor of interfaces 210) to perform functions relating to the techniques described herein, e.g., in conjunction with traffic analysis process 248 (e.g., to train the traffic classifier of process 248).

Operationally, as noted, traffic analysis process 248 may include a random forest-based classifier configured to determine whether a traffic flow in a network is malicious, given the various features extracted from the telemetry data/proxy logs for the flow. To this end, training process 249 may use a training dataset of extracted traffic features that are labeled accordingly (e.g., 'malicious' or 'benign'), such as based on one or more known URL blacklists, input from a security expert, or the like.

Figure 4:
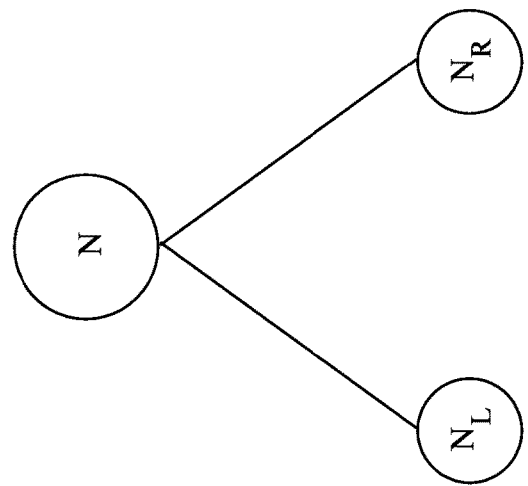
FIG. 4 illustrates an example of a node split operation for training a random forest decision tree.
Figure 4:
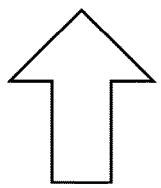
Figure 4:
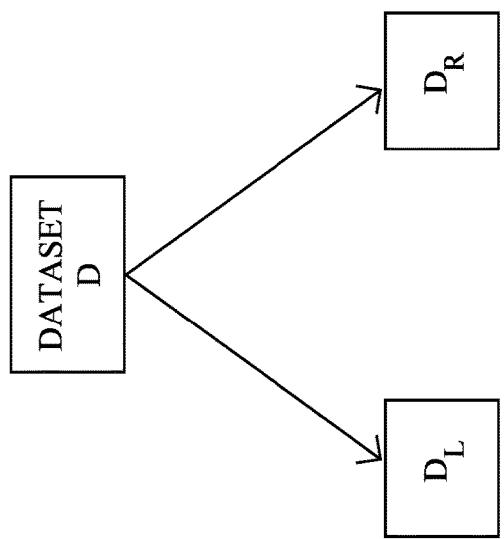

FIG. 4 illustrates an example 400 of a node split operation for training a random forest decision tree, according to various embodiments. As shown, let $D=\{(x_1, y_1), \ldots, (x_n, y_n)\} \subset R^d \times Y$ be a set of training data, where $x_i=(x_1, \ldots, x_d)$ are numeric feature vectors and $y_i$ are classification labels from a set of classes $Y=\{c_1, \ldots, c_k\}$. A decision tree is built recursively starting from the top node N, and splitting node N into child nodes $N_L$ and $N_R$. The data D corresponding to the current node N are split into two subsets $D_L$ and $D_R$ according to a predicate $x_i<\theta$, which minimizes impurity—the diversity of labels of the resulting subsets. A leaf node is constructed if a stopping condition is reached (i.e., reaching a certain tree depth, having a small number of samples to in D), or when the data records in D are pure—all are labeled as a single class. The prediction of such leaf node is the class with maximum frequency among its data points.

Pseudocode for tree formation in a greedy manner is as follows:

---

Require: D = {(x1, y1), . . . , (xn, yn)}
  function BuildTree(D)
    if StoppingCondition(D) or D is pure then
      return leaf node
    else
      (S, DL, DR) = FindBestSplit(D)
      TL = BuildTree(DL)
      TR = BuildTree(DR)
      T = new node storing split S and pointers to subtrees TL and TR
      return T
    end if
end function

---

The most important stage of the above algorithm is FindBestSplit, which needs to determine the splitting dimension i and threshold θ of the optimal split by evaluating all possible splits. To measure the quality of splits in terms of impurity decrease, we use information gain (IG) which is defined as the change in information entropy H from the current state to a state after the split, as shown in the equations below. The optimal split maximizes information gain.

$$IG(D) = H(D) - \frac{|D_L| \cdot H(D_L) + |D_R| \cdot H(D_R)}{|D|}$$

$$H(X) = -\sum_{c \in Y} p(c) \log p(c)$$

where p(c) are the class frequencies in the given data subset X. Entropy is zero if all data points belong to the same class (node is pure), and high when all classes are evenly represented in the data subset. Other measures, such as Gini impurity or variance (usually in regression trees), can be used as well. To find the best split efficiently, D is sorted along each dimension, and a split is considered between each adjacent pair of feature values $x_i$. If class counts are precomputed for each unique feature value, only one to pass over the sorted feature values is then required to find the threshold of the best split on a given feature.

The above approach to training trees of a random forest is well suited for smaller datasets, where all data points fit into memory. To find the best split for a node, the training process needs to iterate over all of its input data, which can be large, especially at higher levels of the tree. For larger amounts of data, this becomes inefficient, as the data has to be gradually loaded into memory from secondary storage and sorting the data along each dimension to find the exact optimal threshold can also become a bottleneck.

In scenarios with a large number of training records in the training dataset saved across multiple machines, as is the case with training records of features extracted from network traffic flows, this approach can be viable. Notably, the feature vectors resulting from feature extraction are usually much more compact than the data itself. For example, the training process can use cluster computing to first process the data and persist the labeled data points, and then perform the classifier training on a single machine with a suitable amount of memory. However, this approach will not be able to deal with an arbitrarily sized dataset. Thus, in various embodiments, the training process may train the classifier in a distributed manner, as detailed below.

Various distributed training approaches exist that can be leveraged for purposes of training a random forest-based classifier. For example, in some embodiments, the node splitting operations used to (re)train the random forest may be performed in parallel by a computing cluster using a MapReduce-based architecture, such as Hadoop MapReduce. During execution, such a framework may maintain two queues: 1.) a first queue that includes nodes of the forest that are too large to split in memory on a single machine (e.g., a single device does not have the resources to store and process the training records to associated with the node) and 2.) a second queue that includes nodes of the forest that can be split on a single device of the computing cluster.

For nodes in the first queue that cannot be split locally on a single device, the mappers of the MapReduce framework may collect statistics required to compute the desired impurity measure for each of the candidate split predicates. In the reduce phase, these statistics can then be grouped to form a set of candidate splits with complete statistics from the whole input set of training records from the training data. Conversely, since the nodes in the second queue can be processed locally on a given device, the device may do so in a greedy manner, as described previously.

In further embodiments, the distributed training may be performed using an Apache Spark-based framework. In general, Apache Spark is an open-source cluster computing system written mainly in Scala. It uses a custom processing engine that can handle general execution graphs, as opposed to the two-stage MapReduce engine. The engine is optimized for in-memory processing and brings a significant performance boost over the disk-based MapReduce in specific applications, such as iterative algorithms, because the reused data is kept in memory and does not need to be saved and loaded from disk between every task. However, Spark outperforms MapReduce even in purely disk-based tasks.

Figure 5:
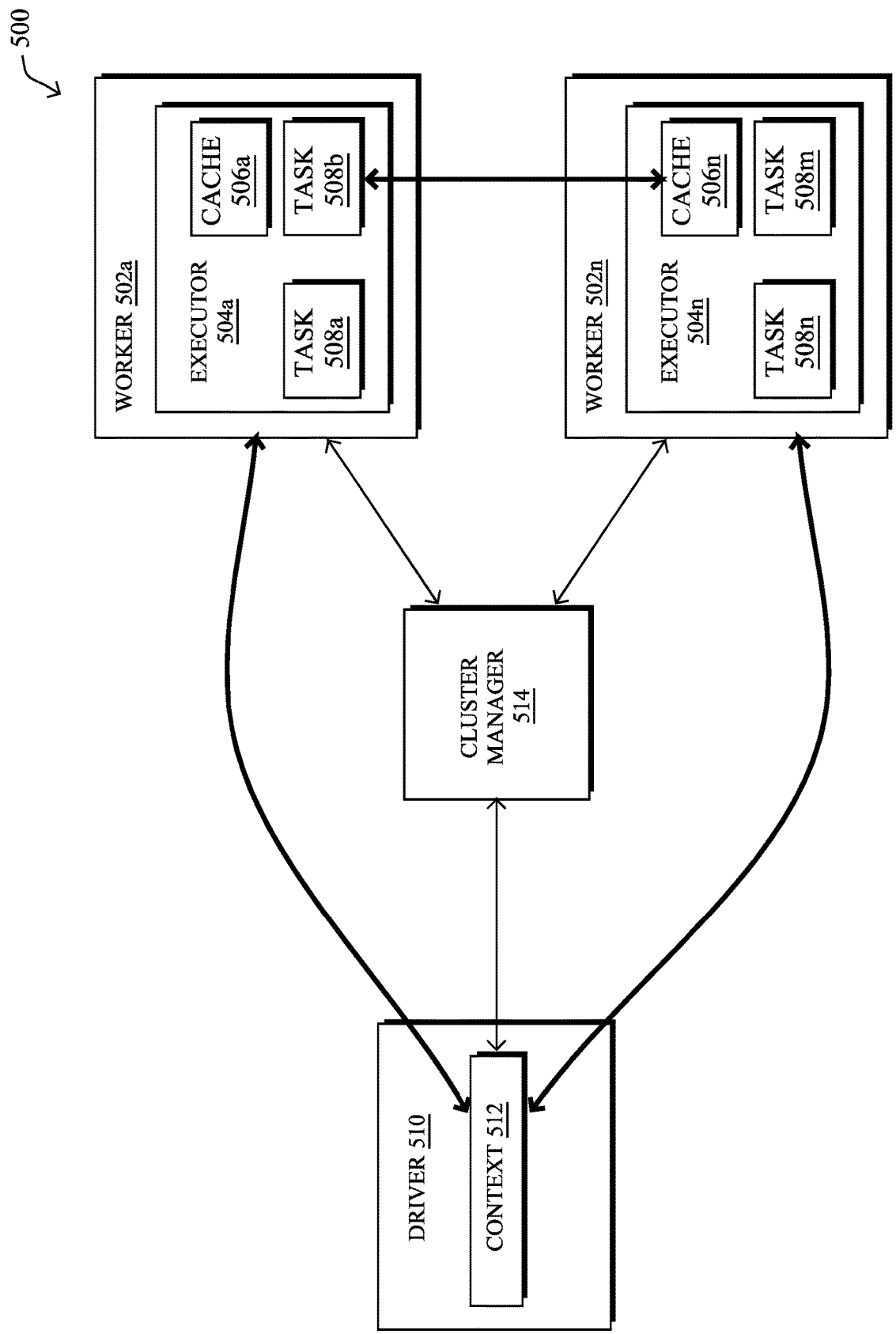
FIG. 5 illustrates an example distributed architecture for training a random forest classifier.

FIG. 5 illustrates an example Spark-based distributed architecture 500 for training a random forest classifier, according to various embodiments herein. To achieve parallelism in the training of the random forest, architecture 500 may be implemented across a computing cluster of n-number of "workers" 502, which may correspond to different physical or virtual computing devices, each having their own cache 506 for storage of data records for processing. The following terminology is used herein to describe the operation of architecture 500:

Application—the highest-level unit of computation in architecture 500 is an application, which is a user program.

Driver—a driver, such as driver 510 shown, is an application corresponds to a single instance of the SparkContext class in a driver program, which coordinates the computation of one or multiple jobs. It acquires executors, transfers the application code to them and sends information about the tasks the executor should process.

Executor—an executor, such as executors 504 shown, is a JVM instance on a worker 502, which runs tasks and keeps data for a single application. It usually stays active throughout the whole lifetime of the application and processes multiple tasks. Executors can also process tasks in parallel if they get multiple cores assigned to them, and multiple executors can run on one worker.

Cluster Manager—the context 512 of driver 510 connects to a cluster manager 514 (e.g., YARN or the like), which allocates resources from workers 502 to individual applications.

Job—a job represents a parallel computation triggered by an action on a distributed dataset. It consists of stages that depend on each other and are processed sequentially.

Stage—a stage represents one step of a job on a distributed dataset. It is a set of parallel tasks, where each task processes a portion of the data.

Task—A task, such as tasks 508 shown, represent a unit of work on one partition of a distributed dataset.

As would be appreciated, one of the available data abstractions available in Spark applications is the Resilient Distributed Dataset (RDD). RDDs are fault-tolerant collections of records distributed over multiple partitions on the cluster nodes. The RDD API abstracts the partitioning and distribution process away and allows users to manipulate the collections using operations similar to those available for standard Scala collections. RDDs support two types of operations:

transformations—lazy operations that return another RDD (e.g. map, reduce, filter)

actions—operations that start the computation and return values (e.g., collect, count)

As of Spark 2.0, RDDs have been replaced by DataFrame and Dataset APIs as the primary data abstraction methods. They are conceptually very similar to RDDs, but is organize the data into named columns, are more optimized and allow higher-level abstraction (e.g., using SQL style queries). However, RDDs are not deprecated and are still used in many scenarios requiring low-level control of the dataset.

Pseudocode for distributed random forest training using architecture 500 may be as following, in some embodiments:

Distributed Training

```
Require: D = {(x₁, y₁), ..., (xₙ, yₙ)}
Require: DistributedQueue = { } //holds pairs (TreeId, Node)
    Splits = FindSplitCandidates(D)
    push all top nodes for all trees onto DistributedQueue
    while DistributedQueue is not empty do
        Nodes = SelectNodesToSplit(DistributedQueue)
        BestSplits = FindBestSplits(Splits, Nodes)
        for (TreeId, N, S, DL, DR) in BestSplits do
            N → Split = S
            N → Left = HandleSplit(DL, TreeId)
            N → Right = HandleSplit(DR, TreeId)
            UpdateNodeIdCache(TreeId, N, S)
        end for
    end while
```

Pseudocode for the HandleSplit function above is also as follows:

HandleSplit

```
if StoppingCondition(D) or D is pure then
    N = new LearningLeafNode
else
    N = new LearningNode
    DistributedQueue → Push ((TreeId, N))
end if
return N
```

Using the above algorithms, input training data records D are stored in an RDD and are partitioned by rows as they get distributed across the memory of allocated executors. If the data records are too large to fit in memory, the disk (or other secondary storage) is used to store the remaining data. On each iteration, the training process splits a set of nodes from DistributedQueue. To find the best split, executors 504 compute sufficient statistics on partitions of the distributed data. All statistics for each node are then collected to an executor 504, which selects the best split. The driver 510 receives information about the best splits, updates the model and enqueues daughter nodes unless stopping conditions are met.

The distributed training pseudocode above uses the following functions:

FindSplitCandidates—this function performs discretization and binning of features. It samples a subset of data, computes equi-depth histograms and returns a set of split candidates for every feature.

SelectNodesToSplit—this function dequeues several nodes off the DistributedQueue (based on the required memory for their sufficient statistics) and generates a random subset of features to be considered for each node. Note that the DistributedQueue is implemented using a stack so that the children of the nodes split in the last iteration and trained next. This way, the algorithm focuses on completing trees rather than training all of them at once, which means fewer trees have to be transferred to executors when a node id cache is not used.

FindBestSplits—this function performs the distributed logic of the algorithm and selects the best split for each node. Executors pass over its partitions of data, and to for each node selected in SelectNodesToSplit, they collect splitting statistics about every split candidate for the selected subset of features. The statistics for each node are aggregated using reduceByKey. From the aggregated statistics, the executors then compute the chosen impurity measure and use it to determine the best split among the candidates for each node.

HandleSplit—this a helper function that checks stopping conditions and creates and enqueues new nodes. Note that the DL and DR passed to this method are not the full data subsets, but rather only the information required to check the stopping conditions—instances of the ImpurityCalculator class containing subset size and impurity value.

UpdateNodeIdCache This method updates the node id cache with node ids of the new nodes created after splitting. It only updates the indices for data points that belong to the split node in the appropriate tree.

During the training, forest nodes may be represented in architecture 500 as LearningNode objects. Nodes that have already been split contain information about the split and pointers to left and right children. The node objects can also represent nodes which have not been split yet—these are kept in the DistributedQueue and gradually dequeued and processed. Once the training process completes, the model is converted into InternalNode and LeafNode objects, which removes fields that are only used during training and not required for evaluation. In some cases, binary encoding may be used to index nodes. If a node has index i, then its left and right children have indices 2i+1 and 2i+2. Binary encoding indices allows for the model to be saved and reconstructed easily without the need to store the tree structure itself, as the indices directly encode the position of the nodes. The downside of this approach is that because the indices are positive integers stored in Int primitives, only $2^{32}-1$ nodes can be indexed this way. In the newer RandomForest API in Spark 2.x, the finished model no longer relies on indices, but because it uses the same underlying class for training, the maximum depth limit remains.

To improve the speed of the random forest training, the training process may also to rely on the concept of local training, whereby a given worker 502 performs a node split operation locally, if it has sufficient (e.g., a threshold) number of training data records for the node under consideration.

Notably, without local training, for each node split using the distributed approach, the executors compute the class counts on their set of partitions and communicate a tuple of sufficient statistics of (features • bins • classes) integers. The total communication cost of splitting one node is therefore equal to (workers • features • bins • classes). Note that this does not depend on the input dataset size, size of the node subsets or tree level. As the algorithm progresses to lower levels of the tree, the input subsets of the nodes become significantly smaller, but the communication cost stays the same for all nodes. The number of nodes can grow exponentially with tree depth. A binary tree of depth d contains at most $2^{d+1}-1$ nodes. For example, if the maximum tree depth M is limited to 30, the subtree of a node on level k will have at most $N=2^{M-k}-1$ nodes. In the worst case, the communication cost of fully training the subtree of a node on level k will be (N workers • features • bins • classes). In a setup with 50 workers, training the subtree of a node on level 15 with training data of 300 features discretized into 32 bins in a classification task with 10 classes will in the worst case require communicating about 585 Gb of data.

In contrast, the communication cost of fully splitting a node using local training is only the memory consumed by all data points in its input subset. For example, assume the input dataset has a total size of 100 Gb. Further, assume that a node of the decision forest on level 15 was already split 14 times and always split in a 4 to 1 ratio. In this case, the largest nodes have input subsets of size 100·0.8=4.40 Gb, which is small enough for local training in most current computing cluster implementations. Note that the distributed communication cost further scales with the number of workers, the number of discretization bins and the number of classes, whereas for local training, this does not matter at all.

Furthermore, implementing local training effectively removes the limit on the maximum tree depth, because the local training algorithms do not rely on node indices. Unless the input data are so massive that we never reach the local training stage, we will be able to train forests of any chosen depth, which could significantly improve the accuracy of the resulting models.

Regardless of the distributed architecture selected to perform the training of the random forest, be it MapReduce-based, Spark-based, or the like, in various embodiments, the distributed training may involve two separate stages: 1.) a distributed stage and 2.) a local training stage.

Initially, the nodes of the random forest are processed in the distributed stage. In this stage the data corresponding to nodes in the forest are spread across the whole computing cluster and statistics related to split points, necessary to determine splits, are computed in a distributed fashion. A threshold is set for the maximum number of training records that has to be present in a node for it to be split locally by a given worker. When a node is split, the subset sizes of child nodes are compared with the local training threshold, and the sufficiently "small" nodes are stored in a separate local training queue. The distributed splitting continues until all remaining nodes can be split locally. At this point the local training is started.

The training process then proceeds by processing the nodes in the local training queue in batches. Each batch contains several local training tasks that are distributed to workers (executors), such as workers 502/executors 504 shown in architecture 500. Before this stage, the sets of training data records are shuffled across the computing cluster so that all the data records belonging to a node, trained on a single worker, are present on the same worker. Workers train complete subtrees from each of the nodes present in the local training queue, and the subtrees are moved to the driver, such as driver 510, where they are aggregated to form the random forest.

Pseudocode for the local training procedure running on the driver (e.g., driver 510) is as follows:

---
Local Training

Require: Dataset D // RDD with bagged data points
Require: LocalQueue = {(TreeId, Node), ...}
  for CurrentTree in (1 . . . NumTrees) do
    TreeNodes = LocalQueue → filter (TreeId == CurrentTree)
    while TreeNodes is not empty do
      Batch = TreeNodes → take (BatchSize)
      Partitions = FilterAndPartitionData (D, Batch)
      CompletedNodes = RunLocalTraining (Partitions)
      UpdateParents (CompletedNodes)
    end while
  end for
---

In other words, the driver 510 may iterate over all trees in the forest and processes smaller batches of local training tasks. First, it filters only the data belonging to nodes in the processed batch and partitions them by node. Each executor 504 then processes one partition and completes the training of its node by running a local training algorithm. Finally, the model is updated with the completed nodes after collecting them in the driver.

First, the training process needs to select the nodes for local training during the distributed stage. A local training queue LocalQueue is used which store nodes with input datasets small enough to be split in memory. Accordingly, the HandleSplit method described previously may be modified as follows:

---
HandleSplit for local training if StoppingCondition(D) or D is pure then
  return new LearningLeafNode
else
    N = new LearningNode
    if D → NumRows < LocalTrainingThreshold then
      LocalQueue → Push ((TreeId, N))
    else
      DistributedQueue → Push ((TreeId, N))
    end if
    return N
end if
---

To decide whether the node is ready for local training, the training process may compare the number of records in its input dataset, which is referred to herein as NumRows, to a precomputed threshold LocalTrainingThreshold. To find LocalTrainingThreshold, the process also needs take into account the memory allocated to one executor MaxMemory, the total number of features NumFeatures, number of classes NumClasses and the number of bins that each feature is discretized into, NumBins. First, the process needs to make sure that the data itself is small enough. Each data point is stored as a TreePoint object, which contains an integer array with a bin index for every feature value and a floating point label, which takes up approximately PointSize=4·NumFeatures+8 bytes. The total approximate size of the data DataSize is NumRows·PointSize bytes.

The other factor is the memory used to store the statistics aggregates required to compute the impurity of all splits. Every feature gets discretized into a number of bins, and for each bin, we need to compute label counts for every class. Therefore, the approximate size of the statistics for every node StatisticsSize is 4·NumClasses·NumFeatures·MaxBins bytes. The data are stored in JVM objects and further manipulated in the local training implementation, so we need additional memory consumption needs to also be taken into account. To have more control over the size of the task, another parameter, MemMultiplier, may also be used. Assume that the total memory usage for a given task TotalSize is equal to MemMultiplier. (DataSize+StatisticsSize). To add a node to the local training queue, the training process needs to check that its TotalSize<MaxMemory. Therefore, the LocalTrainingThreshold can be computed as the value of NumRows for which this condition is satisfied, as shown below.

$$TotalSize < MaxMemory$$

$$MemMultiplier \cdot (NumRows \cdot PointSize + StatisticsSize) < MaxMemory$$

$$\vdots$$

$$LocalTrainingThreshold = \frac{MaxMemory}{MemMultiplier \cdot PointSize} - \frac{StatisticsSize}{PointSize}$$

$$LocalTrainingThreshold \approx \frac{1}{MemMultiplier} \cdot \frac{MaxMemory}{PointSize}$$

Because the value of StatisticsSize/PointSize is negligible, this value can now be interpreted as the number of times a data point fits in total memory, reduced by a fraction controlled by MemMultiplier.

To locally train a node via a node split operation, all of its training data first needs to be moved onto a single machine, and in the context of architecture 500, into the memory of an executor 504. It can only be guaranteed that all of the data are together and no data from other tasks are included when the data are in a single partition. Pseudocode for the partitioning process is as follows:

---
FilterAndPartitionData

Require: Dataset D
Require: Batch = {(TreeId, Node), ...}
Partitions = create a partition for every (TreeId, Node) in Batch
DataWithNodeIds = GetDataWithNodeIds (D, Batch)
for (TreeId, NodeId, Point) in DataWithNodeIds do
    Partitions (TreeId, Node) += Point
end for
return Partitions
---

The local training queue contains only nodes that can be split on a single executor. However, if multiple splitting tasks were run on one executor concurrently, it would soon reach the memory capacity and encounter errors. For this reason, the nodes from the local training queues may be processed in smaller batches of size BatchSize. At the beginning of the local training stage, context 512 can be queried and BatchSize set to the number of available executors 504, so that each executor always handles one training task. Additionally, a custom key partitioner can be used, which distributes data from every node of the current batch into its partition. This gives control over the number and content of the partitions so that we can distribute the data evenly and ensure each to executor only handles one partition.

Recall that the node id cache may store information about the node to which each data point belongs. The cache allows for easy filtering of the dataset to only include data points from nodes in the current batch, as shown in the pseudo code below. Because nodes are being trained for a single tree, only the appropriate column of the node id cache needs to be checked.

---
GetDataWithNodeIds

Require: Dataset D
Require: Batch =
    {(TreeId, Node), ...}
BatchTreeId = Batch → Head → TreeId
BatchNodeIds = Batch → Map (N → Id)
DataWithNodeIds = NodeIdCache → Zip (D)
return DataWithNodeIds
    → Map ((NodeIds, Point) ⇒
      (BatchTreeId, NodeIds (BatchTreeId), Point))
    → Filter ((TreeId, NodeId, Point) ⇒
      BatchIds → contains (NodeId))
---

Once the data is partitioned accordingly, local training can be performed. Each executor 504 then converts the data representation of its partition into a standard Scala Array and uses it as training data for the tree induction of the given node, as shown in the pseudocode below:

---
RunLocalTraining

Require: Partitions = {(TreeId, Node, Data), ...}
return Partitions
    → MapPartitions ((TreeId, Node, Data) ⇒ {
      PointArray = Data → ToArray ( )
      LocalTreeInduction (Node, PointArray)
      return (TreeId, Node)
    })
---

For model updating, in the distributed stage, the splitting is done in driver 510, so that the model stored in the memory of driver 510 can be updated. During local training, the node splitting operations are performed on executors 504 and driver 510 then receives a different node object, which needs to be inserted into the appropriate position in the model.

After the induction of all nodes from the processed batch is finished, the training process may collect the completed nodes in driver 510 and update the current model with pointers to them. If breadth-first indexing of the learning nodes is used, this allows only the node id to be used, to easily find the parent of a completed node and determine whether it is the left or right child of that node. Pseudocode for the model updating is as follows:

---
UpdateParents

Require: CompletedNodes = {(TreeId, Node), ...}
for (TreeId, Node) in CompletedNodes do
    Parent = FindParent (TreeId, Node → Id)
    if IsLeft (Node → Id) then
        Parent → Left = Node
    else
        Parent → Right = Node
    end if
end for
---

Nodes from multiple trees can also be trained in a single batch, in some embodiments. This may seem counter-intuitive at first, as it increases the complexity of the data partitioning process without any immediate benefits, but will eventually allow for further optimization of the training process. The original distributed stage already allows splitting nodes from multiple trees together, although the algorithm attempts to minimize the amount of these operations and prefers splitting nodes from a single tree. In the distributed stage, this does not require manipulating the input dataset, as each to executor only iterates over its designated partitions and calculates statistics for the given set of nodes, regardless of the trees to which they belong.

Since a random forest is being constructed, each decision tree will be split differently and the nodes will have different input datasets. If nodes from multiple trees are allowed to be processed at once, a single data point may be present in multiple input is subsets of the nodes in the currently processed batch. In the case of local training, need the whole input subset needs to be shuffled to an executor 504 in one partition. Therefore, it is no longer sufficient to filter and partition the input dataset, and the data records used in multiple nodes would need to be cloned, so that they can be distributed to multiple partitions. Additionally, instead of simply checking one column of the node id cache, the process would also need to check every (TreeId, NodeId) pair to determine whether a data record is used during the processing of the batch. This requires extending the GetDataWithNodeIds method, as shown in the pseudocode below.

---
GetDataWithNodeIds for multiple trees
---
Require: Dataset D
Require: Batch = {(TreeId, Node), ...}
TreeNodeSets = Batch
    → Map ((TreeId, Node) ⇒ (TreeId, Node → Id))
    → GroupByKey ( )
    → Map ((TreeId, (TreeId, Nodes)) ⇒ (TreeId, Nodes))
BatchTreeIds = TreeNodeSets → Map ((TreeId, Nodes) ⇒ TreeId)
DataWithNodeIds = NodeIdCache → Zip (D)
return DataWithNodeIds
    → FlatMap ((NodeIds, Point) ⇒
      BatchTreeIds
    → Map (T ⇒ (T, NodeIds(T)))
    → Filter ((T, N) ⇒ TreeNodeSets (T) → Contains (N))
    → Map ((T, N) ⇒ (T, N, Point))
---

To be able to clone the appropriate data points efficiently, a map TreeNodeSets to may be precomputed, which stores indices of all nodes for every tree in the current batch, and a set of all tree indices in the batch BatchTreeIds. For every training data record in the input dataset, the process may filter and map over BatchTreeIds, resulting in tuples (TreeId, NodeId, Point) for every node that requires Point in its input subset. These tuples can be concatenated into one RDD collection using flatMap and then the partitioning is logic described above can be applied.

This process theoretically has the same complexity as partitioning nodes from a single tree, as the training process still iterate over the same amount of nodes for each data record. However, it requires checking multiple columns of the node id cache, and the amount of shuffled data also increases when the same data records need to be included several times. These factors will increase the communication cost of the partitioning, but the ability to process nodes from multiple trees together gives more options to select optimized batches and simplifies the local training procedure in the driver program, as demonstrated in the local training pseudocode below:

---
Local Training of multiple trees
---
Require: Dataset D
Require: LocalQueue = {(TreeId, Node), ...}
    while LocalQueue is not empty do
        Batch = LocalQueue → take (BatchSize)
        Partitions = FilterAndPartitionData (D, Batch)
        CompletedNodes = RunLocalTraining (Partitions)
        UpdateParents (CompletedNodes)
    end while
---

In various embodiments, the training process may also use a bin packing approach, to reduce the number of tasks. Notably, the local training queue contains nodes small enough to be split locally, but the sizes of these tasks may greatly differ. Some of these tasks may be close in size to the LocalTrainingThreshold, meaning they indeed require the whole memory of an executor, but many tasks will be significantly smaller. Tiny tasks take up only a small portion of the available memory and complete the tree to induction very fast, meaning most of the total time required to complete these tasks is spent on partitioning and communication.

Accordingly, smaller tasks may be grouped and trained consecutively on one executor, which allows the training process to minimize the number of batches necessary to finish local training. In particular, a lower number of larger partitions can be created, is which are more balanced in terms of size. Doing so also lowers the number of data shuffles, which removes some overhead of this expensive operation.

To create a minimal amount of task groups, the desired goal is to have the total sum of NumRows be lower than LocalTrainingThreshold. This bin packing can be achieved using greedy approximation approaches, such as the first-fit decreasing algorithm. The algorithm sorts the items in decreasing order and then attempts to place each item in the first bin that can accommodate the item. If no such bin exists, it creates a new one. It has been proved that if the first-fit decreasing algorithm is used, the number of the resulting bins will be at most (11/9 Opt+1) bins, where Opt is the number of bins in the exact optimal solution. For purposes of balancing the size of the partitions, this is more than sufficient.

With the additional information available for storage in LocalQueue, a Task class can be created to hold the required data for the local training tasks. It stores the node and tree indices and NumRows of the input subset. In turn, the HandleSplit method can be modified to store these objects in the LocalQueue. A Bin class can also be created, which holds the set of Tasks and a number of TotalRows of the currently packed tasks. The bin packing procedure, which can be run between the distributed and local training stages, is shown in the pseudocode below:

---
Bin Packing
---
Require: LocalQueue = {(Task), ...}
    Bins = { }
    SortedByRows = LocalQueue → SortBy (Task → NumRows)
    for Task in SortedByRows do
        PackTask (Task, Bins)
    end for
---

---
PackTask
---
for Bin in Bins do
    if Task → NumRows + Bin → TotalRows < Threshold then
        Bin → Tasks += Task
        Bin→ TotalRows += Task → NumRows
        return
    end if
end for
NewBin = new Bin
NewBin → Tasks += Task
NewBin → TotalRows += Task → NumRows
Bins += NewBin
---

Several small changes need to be made to the current local training process. Instead of LocalQueue, all methods will now process the Bins queue. In the FilterAndPartitionData method, a partition can be created for every bin instead of creating it for every node. In the GetDataWithNodeIds method, the process needs to iterate over all nodes for every bin in the batch to determine TreeNodeSets and BatchNodeIds. In RunLocalTraining, each partition now contains data points for multiple nodes, so they need to be grouped by the node indices before running the local training.

In various embodiments, the training process may use a synchronous computing model. Notably, every time a batch of tasks is distributed to executors 504, all of the tasks in the batch need to complete before the resulting nodes from the node split operations are collected, the model updated, and another batch distributed. However, this leads to a potential bottleneck in terms of total training time, since the time required to complete the training of each batch is equal to the duration of the longest task in the batch.

Figure 6A:
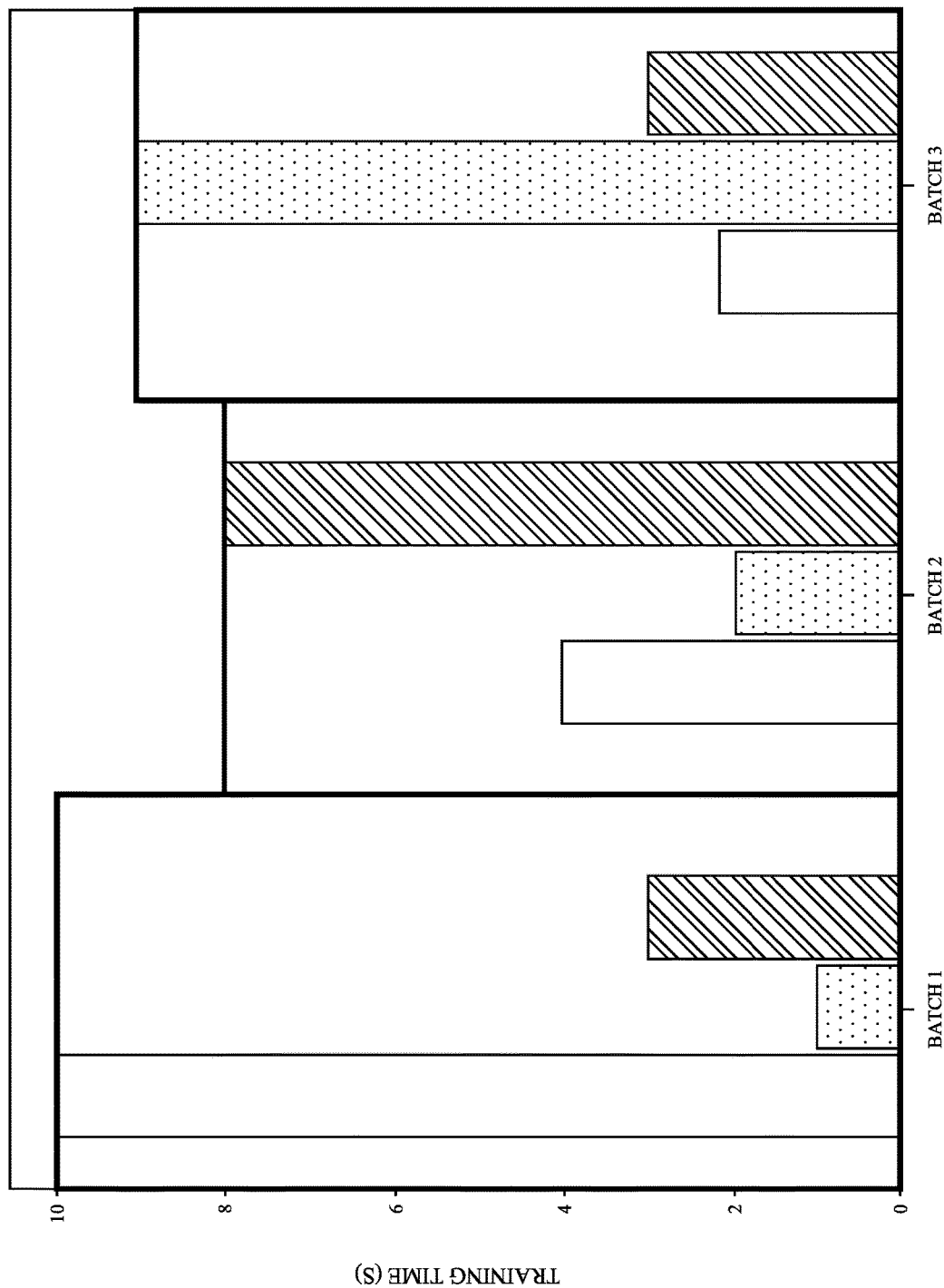
FIGS. 6A-6B illustrate example completion times for node split operations.
Figure 6B:
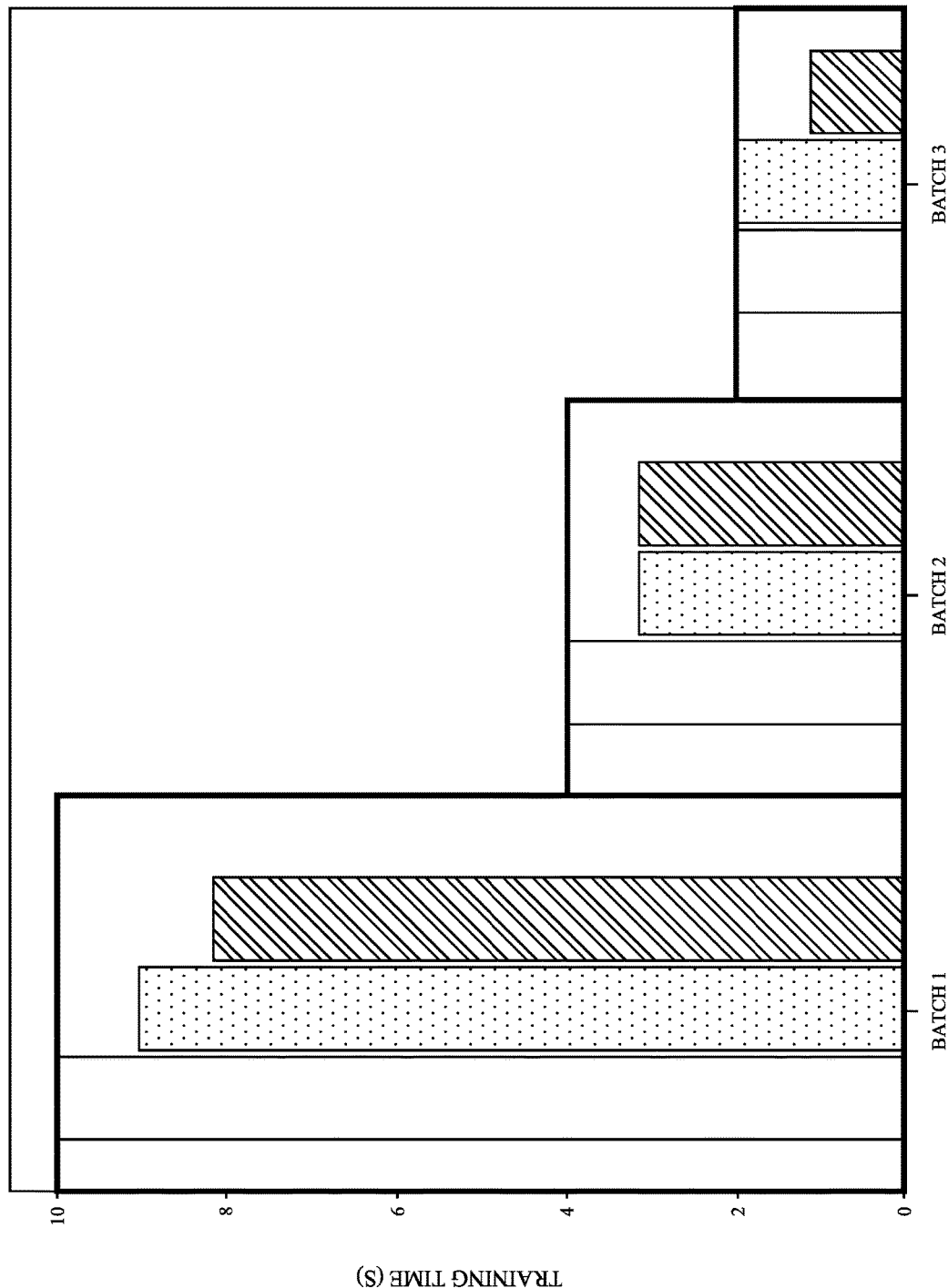

FIGS. 6A-6B illustrate example completion times for node split operations. Plot 600 in FIG. 6A illustrates the training times taken by different workers per batch using a synchronous computing approach. As shown, the total time taken for the first batch is 10 seconds, which corresponds to the longest taking task. However, the other two tasks in this batch complete in one second and three seconds, respectively. Thus, the workers performing these tasks are forced to wait up to nine extra seconds, before beginning the next batch. In the next two batches, a similar pattern can be seen: one of the training tasks takes far longer than the others, forcing the others to wait before moving on to the next batch.

According to various embodiments, a key functionality of the techniques herein is the ability of the training process to coordinate the batches of the training tasks, such tasks having similar completion times are grouped together. For example, as shown in plot 610 in FIG. 6B, consider the rearrangement of the training tasks/node split operations from FIG. 6A such that longer executing tasks are processed in parallel as part of the same batch. By doing so, the completion time for the training in FIG. 6A can be reduced from 27 seconds (10 s+8 s+9 s) down to 16 seconds (10 s+4 s+2 s).

To tackle the task imbalance problem, statistics from the local training stage may first be collected. For example, the RunLocalTraining method highlighted above may be modified so that in addition to running the tree induction method, it measures the time it takes for each node to complete the local training. In turn, the row count and label entropy of each node can be saved, both of which were already computed to determine the best split of their parent nodes during the distributed stage. A structure containing the training time, row count and label entropy can then be returned together with the completed node, allowing driver (e.g., driver 510) to collect these statistics and log them in a file.

As would be appreciated, the completion time to train a node/perform a node split operation is unknown before it occurs. However, in various embodiments, the training process may make use of a machine learning-based predictor configured to predict this to completion time using information available before running the tasks. In particular, the predictor may base the prediction on the following collected information:
 the number of feature vectors/requests (data subset size) to be used for a node to be split
 entropy of labels in the node's data subset Training of the predictor can be achieved by collecting statistics in the training process, such as the above information, as well as potentially the observed task completion times. The training statistics may be collected for each:
 cluster setup we would like to use (e.g. number of workers, executors, cores per executor, max memory per node, etc.)
 similar datasets to be uses in following training runs Note that prediction of the task duration is not necessary, because the tasks only need to be ordered appropriately so that similarly sized tasks are grouped together. Therefore, a consistent offset in predicted training times is not an issue, as only the relative duration of the task compared to other tasks is of interest. This property is very useful if, for example, the computation power of workers is increased, it can be reasonably expected that the ordering of the nodes will stay the same and the predictor will not need to be retrained.

The following table includes training statistics for several nodes measured during experimentation of the techniques herein:

TABLE 1

| Task ID | Node dataset size | Node dataset label entropy | Training time (s) |
|---|---|---|---|
| 1 | 7004 | 0.1079 | 2.12 |
| 2 | 49,710 | 0.0089 | 6.57 |
| 3 | 52,450 | 1.0593 | 74.49 |
| 4 | 108,337 | 0.3919 | 130.96 |
| 5 | 117,986 | 0.9460 | 190.08 |

From Table 1, it can be seen that the training times are highly correlated with the number of input training records (dataset size) for a given node. Therefore, for nodes with larger input subsets it will take longer to complete their full subtree. The nodes in the subtree will take longer to split, as more data needs to be processed. The subtree will usually be deeper and therefore contain more nodes. Additionally, these nodes will require more shuffling of data across executors, which is a highly time consuming to operation.

Secondly, entropy of the training records labels can also affect the training significantly. Data with high entropy in labels contain data points with many different labels, and therefore it may take significantly longer to obtain pure subsets (leafs in the decision tree) using binary splitting. This will result in deeper subtrees related to a specific node. In contrast, nodes with very low entropy might only require a few splits, even if their input subset is large. Notably, it can be seen in Table 1 that, although tasks 2 and 3 have very similar data sizes, the training of task 3 took significantly longer because of the high entropy in labels.

To estimate the training time for a node, linear regression predictor with additional non-linear variables based on size and entropy may be used, in some embodiments. For example, the following stepwise regression model can be used to predict the completion times:

$$t = c_1 * r + c_2 * e + c_3 * (r*e) + c_4 * \log(r) + c_5 * (r*\log(r)) + c_6 * \log(e) + c_7 * (e*\log(e)) + c_8$$

where $c_i$ are the learned weights, t is the predicted time, r is the node dataset size, and e is the node dataset label entropy.

Figure 7:
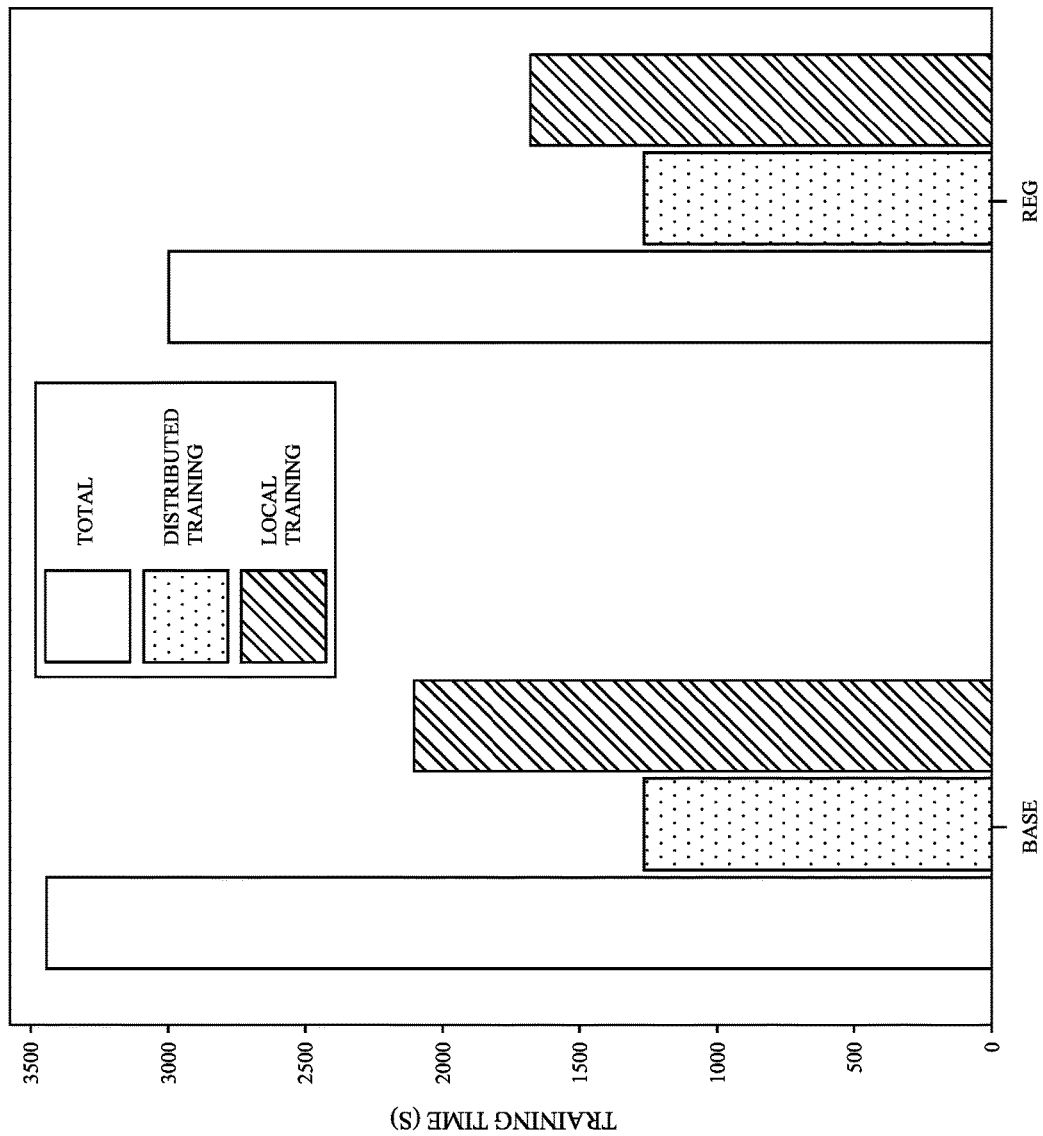
FIG. 7 illustrates an example plot of test results for the techniques herein.

FIG. 7 illustrates an example plot 700 of test results for the techniques herein, to according to various embodiments. More specifically, plot 700 illustrates the total training times needed to train a random forest classifier for HTTP traffic flow classification (e.g., to determine whether a flow is malicious) using different local training approaches. Using the described predictor to schedule tasks leads to over 27% improvement in the local training stage, compared to ordering the tasks purely based on their size (base). The experiment was performed on an AWS EMR cluster (11 r4.2×large instances, 8 CPUs and 61 GB RAM per instance). The training dataset contains roughly million examples.

Figure 8:
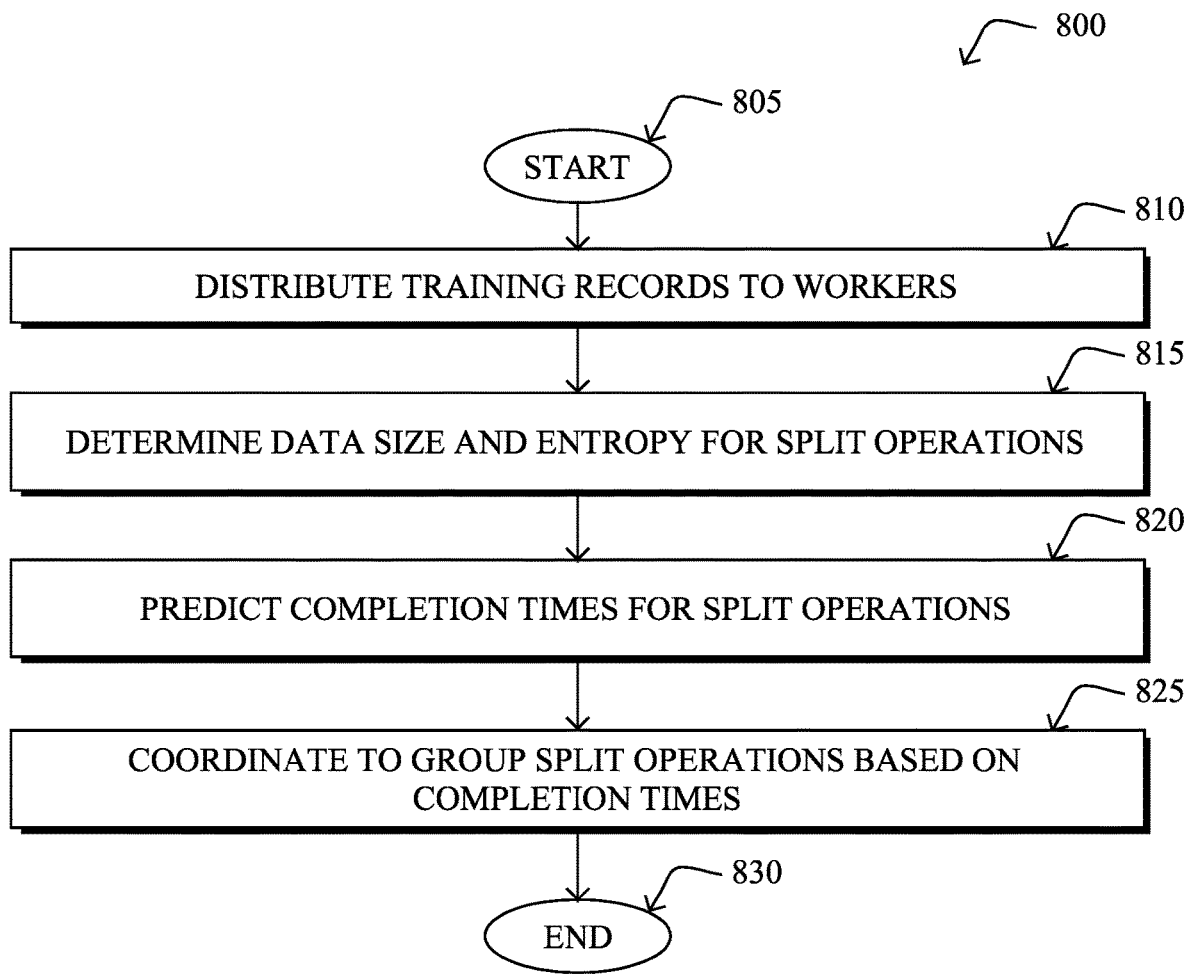
FIG. 8 illustrates an example simplified procedure for training a random forest classifier.

FIG. 8 illustrates an example simplified procedure for training a random forest classifier in a network in accordance with one or more embodiments described herein. For example, a non-generic, specifically configured device (e.g., device 200) may perform procedure 800 by executing stored instructions (e.g., process 249). The procedure 800 may start at step 805, and continues to step 810, where, as described in greater detail above, the device may distribute sets of training records from a training dataset for a random forest-based classifier among a plurality of workers of a computing cluster. Each worker determines whether it can perform a node split operation locally on the random forest by comparing a number of training records at the worker to a predefined threshold. For example, the training records may correspond to sets of features extracted from traffic flow telemetry in the network, such as for HTTP traffic flows.

At step 815, as detailed above, the device may determine, for each of the split operations to be performed locally by the workers, a data size and entropy measure of the training records to be used for the split operation. As noted above, such statistics can be collected from the workers, which may compute these measurements when determining whether a particular node split operation can be performed locally by the worker.

At step 820, the device may apply, for each of the split operations to be performed locally by the workers, a machine learning-based predictor to the determined data size to and entropy measure of the training records to be used for the split operation, as described in greater detail above. The machine may do so to predict a completion time for each of the split operations to be performed. In some embodiments, the predictor may be a regression-based predictor, although other machine learning models can be used in further cases.

At step 825, as detailed above, the device may coordinate the workers of the computing cluster to perform the node split operations in parallel such that the node split operations in a given batch are grouped based on their predicted completion times. For example, the device may cause the workers to perform the split operations in order, according to the predicted completion times. In other words, training tasks that have similar predicted completion times can be clustered together in a batch, to minimize the amount of time that any given worker may spend waiting to begin the next batch. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for distributed random forest training with a predictor trained to balance tasks, it is to be understood that various other adaptations and modifications may be made within the spirit and scope of the embodiments herein. In addition, while certain protocols are shown, such as HTTP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be to implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   distributing, by a device, sets of training records from a training dataset for a random forest-based classifier among a plurality of workers of a computing cluster, wherein each worker determines whether it can perform a node split operation locally on the random forest by comparing a number of training records at the worker to a predefined threshold that is set to a maximum number of training records that must be present in a node for it to be split locally by the worker;
   determining, by the device and for each of the split operations to be performed locally by the workers, a data size and entropy measure of the training records to be used for the split operation;
   applying, by the device and for each of the split operations to be performed locally by the workers, a machine learning-based predictor to the determined data size and entropy measure of the training records to be used for the split operation, to predict a completion time for the split operation; and
   coordinating, by the device, the workers of the computing cluster to perform the node split operations in parallel such that the node split operations in a given batch are grouped based on their predicted completion times.

2. The method as in claim 1, wherein coordinating the workers of the computing cluster to perform the node split operations in parallel such that the node split operations in a given batch are grouped based on their predicted completion times comprises:
   ordering, for a given worker, the split operations to be performed locally by the worker according to their predicted completion times.

3. The method as in claim 1, wherein the training dataset comprises traffic flow features extracted from Hypertext Transfer Protocol (HTTP) traffic flows, and wherein the random forest-based classifier is configured to classify a given traffic flow as malicious or benign based on its features.

4. The method as in claim 1, wherein a worker of the computing cluster waits until the node split operations performed in parallel in a given batch by the other workers are complete, before starting its next node split operation locally.

5. The method as in claim 1, wherein the machine learning-based predictor comprises a regression model.

6. The method as in claim 1, further comprising training, by the device, the machine learning-based predictor by:
   measuring completion times for node split operations performed by the workers; and
   forming a training dataset for the predictor by associating the measured completion times for the node split operations with the data size and entropy measure of the training records used for those split operations.

7. The method as in claim 1, wherein the worker nodes redistribute the training records associated with a particular node of the random forest to a worker that determines that it can perform a node split operation on the node locally.

8. The method as in claim 1, further comprising:
   aggregating, by the device, the split nodes to form the random forest.

9. The method as in claim 1, wherein a node split operation for a particular node of the random forest seeks to divide the training records for that node into two subsets of training records based on values of one or more features in the training records.

10. An apparatus, comprising:
one or more network interfaces to communicate with a network;
a processor coupled to the one or more network interfaces and configured to execute a process; and
a memory configured to store the process executable by the processor, the process when executed configured to:
  distribute sets of training records from a training dataset for a random forest-based classifier among a plurality of workers of a computing cluster, wherein each worker determines whether it can perform a node split operation locally on the random forest by comparing a number of training records at the worker to a predefined threshold that is set to a maximum number of training records that must be present in a node for it to be split locally by the worker;
  determine, for each of the split operations to be performed locally by the workers, a data size and entropy measure of the training records to be used for the split operation;
  apply, for each of the split operations to be performed locally by the workers, a machine learning-based predictor to the determined data size and entropy measure of the training records to be used for the split operation, to predict a completion time for the split operation; and
  coordinate the workers of the computing cluster to perform the node split operations in parallel such that the node split operations in a given batch are grouped based on their predicted completion times.

11. The apparatus as in claim 10, wherein the apparatus coordinates the workers of the computing cluster to perform the node split operations in parallel such that the node split operations in a given batch are grouped based on their predicted completion times by:
  ordering, for a given worker, the split operations to be performed locally by the worker according to their predicted completion times.

12. The apparatus as in claim 10, wherein the training dataset comprises traffic flow features extracted from Hypertext Transfer Protocol (HTTP) traffic flows, and wherein the random forest-based classifier is configured to classify a given traffic flow as malicious or benign based on its features.

13. The apparatus as in claim 10, wherein a worker of the computing cluster waits until the node split operations performed in parallel in a given batch by the other workers are complete, before starting its next node split operation locally.

14. The apparatus as in claim 10, wherein the machine learning-based predictor comprises a regression model.

15. The apparatus as in claim 10, wherein the process when executed is further configured to train the machine learning-based predictor by:
  measuring completion times for node split operations performed by the workers; and
  forming a training dataset for the predictor by associating the measured completion times for the node split operations with the data size and entropy measure of the training records used for those split operations.

16. The apparatus as in claim 10, wherein the worker nodes redistribute the training records associated with a particular node of the random forest to a worker that determines that it can perform a node split operation on the node locally.

17. The apparatus as in claim 10, wherein the process when executed is further configured to:
  aggregate the split nodes to form the random forest.

18. The apparatus as in claim 10, wherein a node split operation for a particular node of the random forest seeks to divide the training records for that node into two subsets of training records based on values of one or more features in the training records.

19. A tangible, non-transitory, computer-readable medium storing program instructions that cause a device in a network to execute a process comprising:
  distributing, by the device, sets of training records from a training dataset for a random forest-based classifier among a plurality of workers of a computing cluster, wherein each worker determines whether it can perform a node split operation locally on the random forest by comparing a number of training records at the worker to a predefined threshold that is set to a maximum number of training records that must be present in a node for it to be split locally by the worker;
  determining, by the device and for each of the split operations to be performed locally by the workers, a data size and entropy measure of the training records to be used for the split operation;
  applying, by the device and for each of the split operations to be performed locally by the workers, a machine learning-based predictor to the determined data size and entropy measure of the training records to be used for the split operation, to predict a completion time for the split operation; and
  coordinating, by the device, the workers of the computing cluster to perform the node split operations in parallel such that the node split operations in a given batch are grouped based on their predicted completion times.

20. The computer-readable medium as in claim 19, wherein the machine learning-based predictor comprises a regression model.

* * * * *

UNITED STATES PATENT AND TRADEMARK OFFICE
CERTIFICATE OF CORRECTION

PATENT NO. : 11,625,640 B2
APPLICATION NO. : 16/152578
DATED : April 11, 2023
INVENTOR(S) : Radek Starosta It is certified that error appears in the above-identified patent and that said Letters Patent is hereby corrected as shown below:

In the Specification

Column 2, Line 62, please amend as shown:
(NANs), personal area networks (PANs), etc. Generally, Column 4, Line 16, please amend as shown:
data centers, cloud environments, devices/nodes, servers, Column 4, Line 58, please amend as shown:
node/device 200 that may be used with one or more Column 5, Line 26, please amend as shown:
device. These software processors and/or services may Column 5, Line 67, please amend as shown:
is minimal. After this optimization/learning phase, traffic Column 6, Line 8, please amend as shown:
supervised machine learning models. Generally, super- Column 6, Line 43, please amend as shown:
as normal, when actually malicious, anomalous, etc. True Column 7, Line 66, please amend as shown:
parallel such that the node split operations in a given batch Column 8, Line 30, please amend as shown:
a certain tree depth, having a small number of samples in Signed and Sealed this
Eleventh Day of July, 2023

Katherine Kelly Vidal
*Director of the United States Patent and Trademark Office*

CERTIFICATE OF CORRECTION (continued)
U.S. Pat. No. 11,625,640 B2

Column 9, Line 7, please amend as shown:
precomputed for each unique feature value, only one pass Column 9, Line 43, please amend as shown:
process the training records associated with the node) and Column 10, Line 60, please amend as shown:
They are conceptually very similar to RDDs, but organize Column 11, Line 62, please amend as shown:
node. Executors pass over its partitions of data, and Column 12, Line 36, please amend as shown:
raining process may also rely on the concept of local Column 15, Line 42, please amend as shown:
evenly and ensure each executor only handles one parti Column 16, Line 51, please amend as shown:
dataset, as each executor only iterates over its designated Column 16, Line 58, please amend as shown:
multiple input subsets of the nodes in the currently Column 17, Line 21, please amend as shown:
a map TreeNodeSets may be precomputed, which stores Column 17, Line 28, please amend as shown:
collection using flatMap and then the partitioning logic Column 17, Line 62, please amend as shown:
of the available memory and complete the tree induction Column 18, Line 2, please amend as shown:
partitions can be created, which are more balanced in Column 19, Line 46, please amend as shown:
configured to predict this completion time using infor- Column 20, Line 25, please amend as shown:
which is a highly time consuming operation.

Column 20, Line 48, please amend as shown:
the techniques herein, according to various embodiments.

CERTIFICATE OF CORRECTION (continued)
U.S. Pat. No. 11,625,640 B2

Column 20, Line 58, please amend as shown:
training dataset contains roughly 30 million examples.

Column 21, Line 20, please amend as shown:
and entropy measure of the training records to be used for Column 21, Line 57, please amend as shown:
the components and/or elements described herein can be